3,744,978
BENEFICIATION OF TITANIUM TETRACHLORIDE
PURIFICATION SLUDGE SOLIDS
William C. Pefferman, New Martinsville, W. Va., assignor to PPG Industries, Inc., Pittsburgh, Pa.
Filed Jan. 8, 1971, Ser. No. 105,034
Int. Cl. B01d 21/00; C01g 23/02
U.S. Cl. 23—293 R  11 Claims

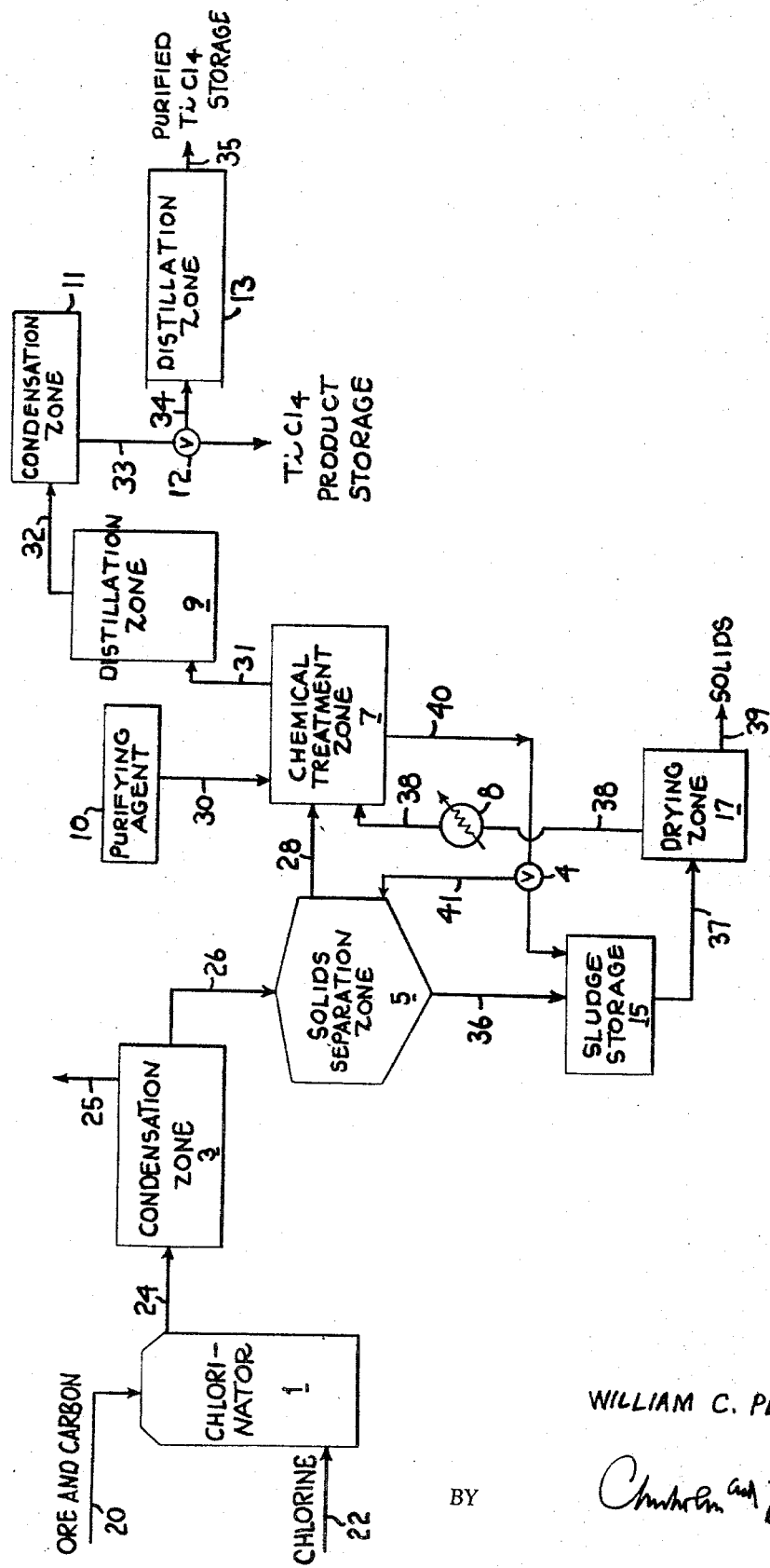

ABSTRACT OF THE DISCLOSURE

The production of titanium tetrachloride by chlorination of titaniferous ore is described. The sludge resulting from chemical purification of crude titanium tetrachloride is concentrated by recycling such sludge to a solids separation zone utilized to separate solids from impure titanium tetrachloride condensate and removing the combined solids from said zone.

BACKGROUND OF THE INVENTION

Titanium tetrachloride is commonly produced by reacting, at temperatures from about 500° C. to about 1400° C., more usually from 800° C. to 1100° C., a titanium-bearing material, such as ilmenite, rutile or titanium-containing slag, with chlorine and a reducing agent, such as carbon or a carbonaceous material, in a static bed or fluosolids reactor. The vaporous product effluent from the reactor comprises, in addition to titanium tetrachloride, carbon monoxide, carbon dioxide, chlorine, hydrogen chloride, phosgene, as well as the chlorides and oxychlorides of the metallic and non-metallic (hereinafter referred to collectively as metal chlorides) impurities present in the ore and carbonaceous material. The aforesaid product effluent is condensed to produce an impure titanium tetrachloride condensate. This material contains, in addition to liquid metal chlorides, solid metal chlorides, most notably iron chlorides, as well as solids carried over from the reactor, such as titanium-bearing material, e.g., rutile ore, and carbonaceous material, e.g., coke. Before subjecting the aforesaid impure titanium tetrachloride condensate to further purification, the solids contained in the condensate are separated therefrom. Solids separation can be conducted by one or more conventional vaporization and/or settling operations. The substantially solids-free material resulting is referred to as crude titanium tetrachloride.

Some of the metallic chlorides and oxychlorides produced in the chlorinator, most notably the vanadium chlorides, have boiling points close to titanium tetrachloride and are not readily eliminated therefrom by fractional distillation. It has, therefore, become customary to treat substantially solids-free, crude titanium tetrachloride chemically prior to distillation to produce a $TiCl_4$ of higher purity. The residue from the aforementioned chemical treatment is conventionally referred to as "purification sludge" because of its consistency. Since the sludge has a considerable amount of recoverable titanium tetrachloride, the sludge is dried in driers and the titanium tetrachloride which is recovered therefrom is recycled back into the process at any convenient point, e.g., the chemical treatment zone or the reactor product effluent condensation zone. Drying of the aforesaid sludge material is time consuming and often is a bottleneck in the process for producing titanium tetrachloride.

It has now been discovered that by beneficiating the purification sludge the amount of material which is handled by the aforesaid driers, per unit amount of $TiCl_4$ produced, can be reduced thereby increasing the efficiency of the driers and achieving a corresponding reduction in the total drier heat load. In particular, it has been discovered that purification sludge having a solids content below that at which the sludge congeals can be removed from the chemical treatment zone and mixed with a slurry comprising titanium tetrachloride and solids from the solids separation zone, to form a mixture of said purification sludge and said slurry with a solids content at least as great as the solids content of said slurry but less than a solids content at which the mixture congeals. More particularly, the aforementioned benefits are obtained by recycling the purification sludge to the impure $TiCl_4$ solids separation zone and then forwarding the resulting combined sludge material to the drying zone. In this manner, the solids level in the purification sludge can be increased from about 38 to 70 percent, i.e. a purification sludge having a solids content of less than 16 percent, e.g., 13 percent, is concentrated to a value, e.g., 18 percent, higher than that existing initially.

BRIEF DESCRIPTION OF THE DRAWING

The single figure is a schematic of a process for producing titanium tetrachloride by chlorination of titaniferous ore including the subsequent treatment of the impure titanium tetrachloride produced thereby which illustrates the process of the present invention.

DETAILED DESCRIPTION

The present invention will be better understood by referring to the following description and the abbreviated schematic flow sheet of the attached figure wherein a particular embodiment of the present invention is depicted.

Titanium tetrachloride is commonly produced by chlorinating a titaniferous ore, such as ilmenite, rutile, arizonite, leucoxene, and titanium slags and concentrates in the presence of carbon or a carbonaceous material, e.g., coke, at temperatures of from about 500° C. to about 1400° C. The chlorination is typically conducted in a static bed or fluosolids reactor. Referring to the accompanying figure, ore and carbon feed is introduced at the top of chlorinator 1 as shown by line 20 and chlorine, as shown by line 22, is introduced near the bottom of the chlorinator to chlorinate the titanium values contained in the titaniferous ore.

The carbonaceous reductant utilized can be any carbon-containing reducing agent that is substantially hydrogen-free since the presence of hydrogen results in the formation of hydrogen chloride which both increases the consumption of chlorine and presents corrosion difficulties. Typically, coke and carbon monoxide are employed; however, other carbon-containing reducing agents such as graphite, charcoal, etc.; can be employed. The amount of carbonaceous reductant admixed with the titaniferous ore will vary; however, typically, the amount ranges from about 10 to about 50 percent by weight, usually from 10 to about 30 percent by weight, of the total composition of the feed charged to the chlorinator.

The product effluent removed from the chlorinator, as shown by line 24, typically comprises vaporous titanium tetrachloride, as well as the other metal and non-metal halide and oxyhalide components of the metal and non-metal values contained in the titaniferous ore and carbon reductant feed that is vaporizable at the chlorination temperatures used. Hereinafter, the aforesaid metal and non-metals will be referred to collectively as metals. Carbon dioxide, carbon monoxide, chlorine, phosgene and entrained solids (normally ore and carbon) are also present in the product effluent. Typical of the metal halide components (other than titanium) are the chlorides of iron, silicon, tin, aluminum, vanadium and chromium.

The product effluent stream removed from chlorinator 1 is forwarded to condensation zone 3 wherein the normally liquid (at ambient temperature and pressure) components of the effluent gas stream are condensed to produce an impure titanium tetrachloride condensate. The uncondensed components of the product effluent stream, principally carbon dioxide, carbon monoxide, chlorine and uncondensed metal halides, are removed from the condensation zone as shown by line 25 and forwarded to a scrubbing zone to remove noxious components therefrom before being burned. Typically,( the scrubbing zone comprises a conventional water or caustic scrubber. Following scrubbing, the resulting gaseous stream, usually referred to as waste gas, is normally diluted with air and forwarded to a vent stack wherein the combustible components thereof, i.e., principally carbon monoxide, are burned.

Since titanium tetrachloride is used in industry as a starting material for the production of such products as titanium metal, pigmentary titanium dioxide, etc., titanium tetrachloride having a high degree of purity is required. Because of the contamination of the impure titanium tetrachloride condensate with the aforementioned entrained solid materials (coke and ore) as well as solid metal chlorides and oxychlorides, further purification steps are typically employed.

The impure titanium tetrachloride condensate produced in condensation zone 3 is a slurry of entrained solids (ore and coke) and solid metal chlorides, most notably iron chlorides, in the normally liquid metal chloride components, principally titanium tetrachloride. Typically, most of the aforementioned solid components are removed from the impure $TiCl_4$ condensate before subjecting the liquid titanium tetrachloride to purification by chemical treatment and distillation. The separation of solid components from the liquid components of the forward flow slurry can be accomplished readily in a solids separation zone 5 that can be either a settling tank or heated tank in order to vaporize the liquid components of the condensate away from the solids contained therein.

As shown in the accompanying figure, the forward flow slurry from condensation zone 3 is forwarded to solids separation zone 5 by line 26. There, substantially all of the solids in the slurry are separated therefrom. The solids or sludge, as it is often called, accumulated in the solids separation zone 5 is removed from that zone by line 36 into a sludge storage tank 15. The percent solids in the sludge removed from separation zone 5 should be as high as possible and can comprise from about 15 to about 30 percent, more typically from 18 to 22 percent. At high solids levels, the sludge tends to set up and becomes non-flowable or pumpable. The exact level at which the sludge becomes too viscous for flow varies with its chemical composition and temperature, the form of which varies with the particular titaniferous ore chlorinated. Since the liquid portion of the sludge is principally titanium tetrachloride, the sludge material is forwarded to drying zone 17, as shown by line 37, where the sludge is heated to dryness. The resulting solids are removed from the drying zone, as shown by line 39, and, if desired, can be treated further to recover the metal values contained therein. Metal halide, e.g., titanium tetrachloride, vapors are removed from the drying zone 17, as shown by line 38, condensed in condenser 8 and forwarded to chemical treatment zone 7. As discussed hereinabove, the condensate from condenser 8 can be forwarded or recycled to any convenient point in the process.

As noted above, metal chlorides other than titanium tetrachloride are present in crude titanium tetrachloride. One such chloride, i.e., the vanadium chlorides, are not separated easily from titanium tetrachloride by distillation because of the proximity of their boiling points to titanium tetrachloride. The vanadium chlorides can be present in the form of vanadium tetrachloride and/or vanadium oxychlorides. Vanadium chlorides comprise a significant portion of the metal chloride impurities in crude titanium tetrachloride and, hence, are partly responsible for the yellowish color of crude $TiCl_4$. By way of example, a typical crude $TiCl_4$ can comprise from about 0.10 to about 1.0 weight percent vanadium, calculated as $V_2O_5$ based on the weight of titanium tetrachloride.

It is customary to treat crude titanium tetrachloride with chemical reagents, most notably organic purifying agents, that have an affinity for vanadium in order to tie up the vanadium as a high boiling chemical complex. The chemical purifying agents disclosed in the art are well known in this field. Among the purifying agents disclosed in the art there can be mentioned: sulfur, hydrogen sulfide, chlorinated hydrocarbons, metals such as copper and powdered iron, either alone or in combination with alkaline agents, metal hydrides and other organic treating agents such as animal oil, e.g., talpa oil, vegetable oils, e.g., tall oil, waxes and hydrolyzed and saponified derivatives such as fatty acids, fatty alcohols and soaps; petroleum fractions, such as lubricating oil, mineral oil and heavy residual fractions, such as Bunker "C" oil and predominantly hydrocarbon polymers such as polyethylene and polypropylene. Typically, from about 0.03 to about 10 percent by weight of purifying agent, based on the amount of $TiCl_4$ treated, having affinity for vanadium is used.

As shown in the drawing, crude titanium tetrachloride from solids separation zone 5 is forwarded to chemical treatment zone 7 as shown by line 28. This material is substantially free of solids, i.e., contains typically from 0.5 to 0.9 percent solids. Purifying agent from head tank 10 is introduced into the chemical treatment zone 7, as shown by line 30, either batchwise or continuously. There, the purifying agent having affinity for vanadium is intimately mixed with the substantially solids free crude titanium tetrachloride. Chemical treatment zone 7 is normally maintained near the boiling point of titanium tetrachloride, i.e., between 270° F. and 300° F. so that the metal halide vapors, e.g., titanium tetrachloride vapors, that are driven from the liquid surface in zone 7 are removed and forwarded to distillation zone 9, as shown by line 31. The overhead from distillation zone 9 is forwarded to condensation zone 11, as shown by line 32, from which substantially vanadium-free titanium tetrachloride is recovered. This material can be forwarded to titanium tetrachloride product storage as shown by line 33 or, if desired, by manipulation of valve 12 can be forwarded to distillation zone 13, as shown by line 34, for further purification. The resulting purified material is removed to purified $TiCl_4$ storage as shown by line 35.

As titanium tetrachloride is removed from chemical treatment zone 7 (batchwise or continuously), the solids level in the liquid in the chemical treatment zone rises. The level of solids in this zone must be limited to a level and/or temperature at which the contents of the zone remain flowable or pumpable, i.e., the material in the treatment zone has a tendency to congeal in the form of a pasty-type material when the solids level reaches too high a level. In the event that congealing of the liquid mass in zone 5 occurs, the entire process must be shut down and the chemical treatment zone cleaned and flushed. The exact solids level at which the contents of treatment zone 5 congeal and become non-flowable is a function of temperature, viscosity and chemical composition. Since the temperature is relatively constant and the chemical composition varies with the ore being chlorinated, it is customary to stay at a solids level below the maximum permitted in order to insure that fluctuations in the viscosity produced as a result of the changing chemical composition of the treatment zone do not cause congealing accidentally. The maximum tolerable level of solids in treatment zone 7 is normally about 16 percent. This level is lower than that present in the bottoms of solids separation zone 5 because the solids in treatment zone 7 have a greater tendency to congeal and become non-flowable. This is believed to be, in part, due to the nature of the high boiling chemical complexes formed in that zone.

Normally, when the solids level of the contents in the treatment zone 7 reaches a level above which the viscosity of the contents can become too high for pumping, the treatment zone is partially purged. Typically, from one-half to four-fifths of the contents of the treatment zone is removed therefrom and the remaining heel diluted with crude titanium tetrachloride from solids separation zone 5. Since the crude TiCl$_4$ has less than 1.0 weight percent solids, the solids level in the treatment zone is dropped to a relatively lower and safe level. Conventionally, the purification sludge removed from treatment zone 7 is forwarded to sludge storage 15, as shown by line 40, from whence the sludge is forwarded to drying zone 17 as described heretofore.

While it is possible to continue vaporization in chemical treatment zone 7 until a dry solids residue is obtained, this is not done in practice for several reasons. First, it is difficult to remove such solids residue from the equipment used and second during evaporation to dryness, thermocracking of the residue can, in some cases, take place thereby releasing impurities into the titanium tetrachloride and thereby contaminating the product.

In sludge storage 15, the purification sludge is mixed with the sludge removed from solids separation zone 5. Depending on the production rate of each of the aforementioned sludge streams, the solids concentration in sludge storage tank 15 can vary from about 13 to about 22 percent. The lower value contemplates little or no removal of sludge from zone 5, while the upper value contemplates little or no purification sludge removal from treatment zone 7. More typically, the ratio of purification sludge removal from treatment zone 7. More typically, the ratio of purification sludge to sludge from the separation zone ranges from 1:5 to 1:1.

In accordance with the present invention, the purification sludge removed from treatment zone 7 is recycled via line 40, valve 4 and line 41 into solids separation zone 5. For best results, the purification sludge is introduced near the bottom portion of the solids separation zone so as not to contaminate substantially solids-free material flowing out of solids separation zone 5 into chemical treatment zone 7 as indicated by line 28. By this maneuver, the solids in the purification sludge removed from treatment zone 7 is beneficiated or concentrated from about a 13–15 or 16 percent solids level up to about an 18–22 percent solids level, an increase of from about 38 to about 70 percent depending on the solids levels that the two zones are maintained. While it might be expected that the increased solids level of the purification sludge, as a result of its addition to the solids separation zone, would cause the purification sludge to become non-flowable and thereby plug the line connecting separation zone 5 with sludge storage tank 15, this has not been found to occur. It is believed that the dilution effect produced by the addition of impure titanium tetrachloride condensate to the purification sludge permits the solids level of the purification sludge to be increased to the levels at which separation zone 5 is operated.

The benefits obtained from the aforementioned process are numerous. First, the amount of solids charged to the driers contained in drying zone 17 is higher per charge, thereby resulting in a higher throughput through the drying zone. Thus, less heat is required to dry a given amount of sludge material fed to the drying zone, i.e., a reduction in the heat duty on the driers in the drying zone. Second, the amount of titanium tetrachloride recovered and handled from the drying zone is reduced. Third, the treatment capacity of the process can be balanced against the crude TiCl$_4$ production capacity. Thus, when the production of crude titanium tetrachloride exceeds the capacity of sludge storage tank 15 and drying zone 17, the excess purification sludge can be stored in solids separation zone 5 until the balance of treatment and production capacities is restored. Finally, the solids content of sludge charged to the drying zone remains constant at the 18–22 percent level which permits uniform operation of the drying zone.

The present process is more particularly described in the following examples which are intended as illustrative only since numerous modifications and variations therein will be apparent to one skilled in the art.

Example I

Rutile ore mixed with about 20 percent coke was chlorinated in a fluidized bed reactor and the product effluent condensed to produce an impure titanium tetrachloride condensate containing about two percent solids. The solids were composed principally of iron chlorides, coke, rutile ore, silica, zirconia and the chlorides of chromium, magnesium, calcium, aluminum and zirconium. The liquid TiCl$_4$ condensate contained as the principal impurities, the chlorides of silicon, tin and vanadium. About 1.5 percent of the aforesaid solids were removed in a solids separation zone and the resulting crude TiCl$_4$ containing about 0.5 percent solids forwarded to a treatment tank. In the treatment tank, the crude TiCl$_4$ was mixed with about 0.1 weight percent talpa oil to tie up the vanadium impurity. The content of the treatment tank were held at about 290° F. to drive off TiCl$_4$ vapors. These vapors were condensed and distilled in a distillation column to produce a substantially vanadium-free TiCl$_4$ product. When the solids level in the treatment tank reached about 13 percent, about one-half of the treatment tank material (purification sludge) was removed to a sludge storage tank where it was mixed with about 1.5 times its weight of about 20 percent solids sludge from the solids separation zone. The resulting mixture of sludges had a solids content of about 17 percent. This material was dried and yielded 344 pounds of drier solids per ton (2,000 pounds) of feed charged to the driers.

Example II

The procedure of Example I was repeated except that the purification sludge removed from the treatment tank was recycled back to the solids separation zone instead of the sludge storage tank. The solids level of sludge material removed from the solids separation zone was maintained at about 20 percent. No difficulties were encountered in handling or pumping this material. The sludge removed from the solids separation zone was dried and yielded 400 pounds of drier solids per ton of feed charge to the driers.

Examples I and II illustrate that when the process of the present invention is utilized, there results an increase of over 17 percent in the throughput of the driers, based on the amount of drier solids produced. At the same time, there is a decrease of similar proportions in the quantity of TiCl$_4$ recovered from the driers which must be handled and returned to the process.

While there are above described a number of specific embodiments of the present invention, it is obviously possible to produce other embodiments and various equivalent modifications thereof without departing from the spirit of the invention.

Having set forth the general nature and specific embodiments of the present invention, the scope thereof is now particularly pointed out in the appended claims.

I claim:

1. In the process of producing titanium tetrachloride wherein a titanium-bearing material is chlorinated to provide an impure titanium tetrachloride condensate containing solids, a slurry of titanium tetrachloride containing solids and crude liquid titanium tetrachloride are separated from the condensate in a solids separation zone, the crude liquid titanium tetrachloride is treated chemically in a treatment zone with a purifying agent having an affinity for vanadium to produce a purification sludge containing vanadium impurities and purified titanium tetrachloride, and the purification sludge is removed from the treatment zone and heated in a drying zone to recover titanium tetrachloride, the improvement which comprises reducing the heat duty of the drying zone by removing purification sludge having a solids content below that at which the sludge congeals from the treatment zone, mixing therewith solids containing slurry obtained from the solids separation zone, the solids content of the slurry being greater than the solids content of the purification sludge, removing sufficient liquid titanium tetrachloride from the resulting mixture to produce a mixture with a solids content at least as great as the solids content of said slurry but less than a value at which the mixture congeals to thereby concentrate the solids level of the purification sludge, and heating the concentrated purification sludge in a drying zone to recover titanium tetrachloride.

2. The process of claim 1 wherein the purification sludge has a solids content of from about 13 to about 16 percent.

3. The process of claim 1 wherein said slurry has a solids content of from about 15 to about 30 percent.

4. The process of claim 1 wherein said purification sludge has a solids content of from about 13 to about 15 percent and said slurry has a solids content of from about 18 to about 22 percent.

5. The process of claim 1 wherein the crude titanium tetrachloride is treated with an organic purifying agent having affinity for vanadium in said treatment zone.

6. The process of claim 1 wherein the organic purifying agent is talpa oil.

7. The process of claim 1 wherein said mixing step is accomplished by recycling said purification sludge to said solids separation zone.

8. In the process of producing titanium tetrachloride wherein a titanium-bearing material is chlorinated to provide an impure titanium tetrachloride condensate containing solids, a slurry of titanium tetrachloride containing solids and crude liquid titanium tetrachlorde are separated from the condensate in a solid separation zone, the crude liquid titanium tetrachloride is treated chemically in a treatment zone with an organic purifying agent having affinity for vanadium to produce a purification sludge containing vanadium impurities and purified titanium tetrachloride, and the purification sludge is removed from the treatment zone and heated in a drying zone to recover titanium tetrachloride, the improvement which comprises reducing the heat duty of the drying zone by removing purification sludge having a solid content of less than 16% from said treatment zone, introducing purification sludge into said solids separation zone, concentrating the solids content of said purification sludge to a value greater than 16% but less than a value at which the purification sludge congeals, by removing liquid titanium tetrachloride therefrom, removing concentrated sludge from said solids separation zone and heating the concentrated sludge in a drying zone to recover titanium tetrachloride.

9. In the process of producing titanium tetrachloride wherein a titanium-bearing material is chlorinated to provide an impure titanium tetrachloride condensate containing solids, a slurry of titanium tetrachloride containing solids and crude liquid titanium tetrachloride are separated from the condensate in a solids separation zone, the crude liquid titanium tetrachloride is treated chemically in a treatment zone with an organic purifying agent having affinity for vanadium to produce a purification sludge containing vanadium impurities and purified titanium tetrachloride, and the purification sludge is removed from the treatment zone and heated in a drying zone to recover titanium tetrachloride, the improvement which comprises reducing the heat duty of the drying zone by removing purification sludge having a solid content of from about 13 to about 15% from the treatment zone, introducing said purification sludge into said solids separation zone, removing liquid titanium tetrachloride from the solids separation zone to thereby concentrate the solids content of the purification sludge, removing concentrated purification sludge having a solids content of from about 18 to about 22% from said solids separation zone, and heating the concentrated purification sludge in a drying zone to recover titanium tetrachloride.

10. The process of claim 8 wherein the purification sludge removed from said treatment zone has a solids content of from about 13 to 15 percent.

11. The process of claim 10 wherein the solids content of the concentrated sludge is from about 18 to 22 percent.

References Cited

UNITED STATES PATENTS

| | | | |
|---|---|---|---|
| 3,156,630 | 11/1964 | Fahnoe | 423—84 |
| 2,230,538 | 2/1941 | Jenness | 423—76 |
| 2,758,009 | 8/1956 | Guthrie | 423—76 |
| 3,258,064 | 6/1966 | Gniewels | 423—77 |
| 2,958,574 | 11/1960 | Hansley | 423—76 |
| 3,533,733 | 10/1970 | Clark | 423—77 |

FOREIGN PATENTS

| | | | |
|---|---|---|---|
| 905,370 | 10/1960 | Great Britain | 23—87 TP |
| 586,919 | 11/1959 | Canada | 23—87 TP |

UNITED STATES PATENTS

Defensive Publication 718, 727 Purification of Titanium Tetrahalides, July 11, 1950, Stoddard.

NORMAN YUDKOFF, Primary Examiner

S. J. EMERY, Assistant Examiner

U.S. Cl. X.R.

23—300, 312 R; 423—65, 76, 82